United States Patent Office 3,733,271
Patented May 15, 1973

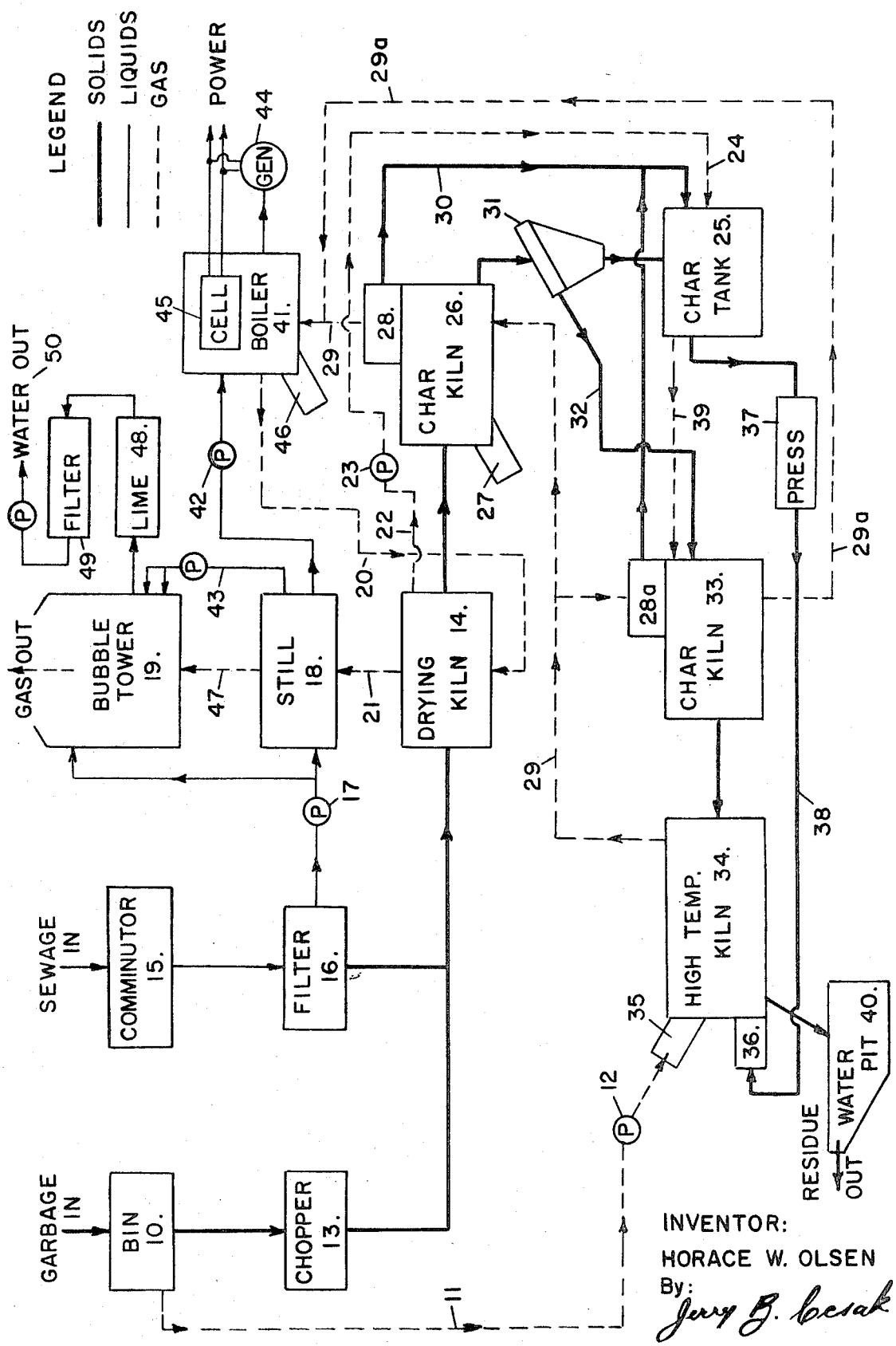

3,733,271
WASTE DISPOSAL APPARATUS AND METHOD
Horace W. Olsen, 2038 North Blvd.,
Houston, Tex. 17006
Filed Jan. 12, 1971, Ser. No. 105,812
Int. Cl. C02c 3/00
U.S. Cl. 210—63
3 Claims

ABSTRACT OF THE DISCLOSURE

Solid waste in garbage, trash and sewage is subjected to progressive incineration and reduced to inert residue capable of reclamation. Combustion gases are utilized for generation of steam and electricity, and are freed of sulphur and other atmospheric pollutants. Liquid sewage effluent is made potable by chemical treatment.

This invention relates to new and useful improvements in the art of waste disposal, particularly disposal of waste materials such as garbage, trash, sewage and the like, and the principal object of the invention is to provide improved apparatus and method whereby such waste disposal may be effected in an economical, sanitary and highly efficient manner without materially affecting standards of ecology.

This object is attained by progressively incinerating solid wastes at a high temperature so as to break down heavy hydrocarbons into carbon dioxide and water with much reduced chemical pollution of the atmosphere.

Second, much of the high heat of incineration is utilized to produce electric power and distilled water, thus materially reducing thermal pollution of the atmosphere.

Third, by utilizing some of the produced power in electric arcs in flue gases of incination, nitrogen fixation occurs which allows sulphor dioxide to oxidize to sulphur trioxide, which can be easily removed to further assist in reducing chemical pollution of the atmosphere.

Fourth, by filtering and other treatment, the liquid constituent of sewage is converted to potable water.

Fifth, the progressive incineration of the solid constituents eventually results in an inert residue of metal, ceramics, glass, ashes, et cetera, suitable for use as "fill" material or for metal reclamation.

With the foregoing more important object and features in view and such other objects and features which may become apparent as this specification proceeds, the invention will be understood from the following description taken in conjunction with the accompanying drawing wherein the single drawing figure is a flow diagram of the apparatus and method of the invention.

Referring now to the accompanying drawing in detail, solid waste such as trash, garbage, and the like is delivered into a surge bin or tunnel 10 which is maintained at negative air pressure to prevent escape of odors into the atmosphere, as for example by a suction line 11 of a pump or blower 12. From the bin 10 the waste material is conveyed to a chopper 13 where it is chopped into suitably sized fragments for delivery into a drying kiln 14. A suitable air lock (not shown) is provided between the bin 10 and the chopper 13, through which air lock the material passes without materially affecting the negative air pressure in the surge bin. Similar such air locks are also provided at other points in the apparatus where their use is desirable or necessary.

In coming sewage flows by gravity into an odor-tight comminutor 15 where it is converted into a thin slurry which is pumped to a multiple stage filter station 16. The latter may be immediately adjacent to or at some considerable distance from the comminutor 15. Solids filtered from the slurry at the station 16 are conveyed to the aforementioned drying kiln 14, while the liquid effluent is delivered by a pump 17 to a vacuum still 18 and also to a bubble tower 19, both hereinafter described.

The drying kiln 14 is indirectly heated by hot gases conveyed through a line 20, and after passing through the kiln 14, these hot gases flow through a line 21 to heat the vacuum still 18. The kiln 14 has an internal thread with lugs to distribute and agitate the waste solids for a maximum sulface exposure, while vapors and noxious gases are withdrawn through the suction line 22 of a pump 23, the outlet of which discharges through a line 24 below the water line of a water containing char tank 25.

The dried solid waste is conveyed from the kiln to a first char kiln 26 which is equipped with a gas or oil burner 27 for use in "starting up" or when the solid waste input is so erratic that continuous flames in the kiln 26 cannot be maintained without such a burner. Like the kiln 14, the kiln 26 also has an internal thread for agitating and exposing a maximum sulface of the waste material to incineration. During the incineration process in the kiln 26, some of the combustible solids are burned completely while some of them merely become charred and are picked up by the combustion gases. These charred solids become deposited on a traveling screen 28 which takes them out of the flow path of the combustion gases which leave the kiln through a line 29, and the charred solids are delivered as at 30 into the char tank 25 where they float on the water and may be skimmed off.

Burning solids and incombustibles are discharged through an air lock from the char kiln 26 onto a vibrating screen 31 which passes most of small abrasive components to the bottom of the char tank 25 and diverts combustibles and larger incombustible components as at 32 into a second char kiln 33. The latter is similar to the first char kiln 26 and also has a traveling screen 28a for extracting charred solids from the flow path of combustion gases passing through the kiln 33, such charred solids also being delivered into the char tank 25 as already explained in connection with the kiln 26.

The burning waste and incombustibles in the second char kiln 33 are discharged through an air lock into a high temperature, refractory-lined kiln 34. Such materials may include heavy blocks of wood, rubber tires, metal pieces and glass, and the temperature in the kiln 34 is just under the melting point of glass, being provided mainly by a gas or oil burner 35 and supplemented by brickette fuel burning on a traveling grate 36 of the kiln. Alternatively, the brickette fuel may be the main source of heat, supplemented by the burner 35, such brickette fuel being obtained by skimming the aforementioned charred solids off the water in the char tank 25, drying the same, compacting them into a brickette form in a press 37, and then delivering them as at 38 to the grate 36 of the kiln 34. Conveniently, odorous gases withdrawn from the surge bin 10 through the line 11 may be delivered by the pump 12 to be burned in the kiln 34, as indicated. The noxious gases passing from the drying kiln 14 through the line 24 into the char tank 25 rise through the water therein and are then passed as at 39 to be burned in the char kiln 33.

Ashes, metals, glass and other non-combustibles are dropped from the kiln 34 through an air lock into a water pit 40. This shatters much of the glass or ceramics and cools the metals so that an inert residue may be recovered from the pit 40 for use as land "fill" or for metal reclamation if so desired.

The hot flue gases from the high temperature kiln 34 are conducted as at 29 through the first char kiln 26 and also as at 29a through the second char kiln 33 to the furnace of a water boiler or steam generator 41, from which the gases then pass as at 20 to heat the drying kiln 14 and as at 21 to vaporize water in the still 18. The distilled water there produced is fed as at 42 to the boiler 41 and also as at 43 to the first and second stages of the bubble tower 19 as hereinafter described.

The steam generated in the boiler 41 is delivered to the turbine of an electric generator 44 which produces current for auxiliary equipment of the disposal plant and also for electric arcs in labyrinth type sparking cells 45 provided in the furnace of the boiler. As the flue gases pass through these cells, their temperature is locally raised by the electric arcs to a point where nitrogen fixation occurs, and this allows sulphur dioxide in the gases to oxidize to trioxide. Since these chemical reactions are very unstable at high temperature at which they occur, the flue gases are cooled as rapidly as possible by exposure to the heat absorbing surfaces of the boiler. The boiler 41 may be equipped with an auxiliary oil or gas burner 46 to assure its operation in the event of an interruption in the supply of hot gases from the kilns 34, 33 and 26.

After leaving the furnace of the boiler 41 as at 20 and passing through the drying kiln 14 and still 18, the flue gases are cooled further and are delivered as at 47 to the bubble tower 19. This tower has several stages between which liquid does not communicate, the first two stages being charged with distilled water delivered from the still 18 as at 43. The first stage traps fly ash and inert dust particles present in the flue gases and also absorbs some of the sulphur trioxide to produce sulphuric acid. The second stage is designed to absorb practically all of the remaining sulphur trioxide. The third stage is a multi-level or tray stage into which sewage effluent from the filter 16 is delivered by the pump 17. The effluent flows downwardly over the successive trays and is treated with acids produced by this process to oxidize any biotics in the water.

After the treated water leaves the bubble tower 19, it is given a lime treatment as at 48 to precipitate the phosphates therein and is then filtered as at 49 to remove any solids, so that potable water is delievered as at 50.

It will be apparent from the foregoing that the apparatus and method of the invention facilitate disposal of solid material in both garbage and sewage by progressive incineration with the result that waste is reduced to ashes and incombustibles remain as an inert residue for use as land fill or for reclamation of valuable metals. Combustion gases are freed of fly ash, dust and sulphur, sewage effluent is made potable by chemical treatment, and both chemical and thermal pollution of the ecology is kept at an acceptable, benign level.

While in the foregoing there has been described and shown the preferred embodiment of the invention, various modifications and equivalents may be resorted to within the spirit and scope of the invention as claimed.

What is claimed as new is:

1. A method for disposal of solid waste material such as trash, garbage and solid sewage constituents, said method comprising the steps of:
    (a) comminuting the solid material into fragments,
    (b) drying the fragmented material in a drying kiln while withdrawing vapor and noxious gases therefrom,
    (c) progressively incinerating the dried material in at least one char kiln and thereafter in a high temperature kiln so that combustible components of the material are burned and incombustible components remain as inert residue,
    (d) separating a portion of charred combustible from material passing from the char kiln to the high temperature kiln,
    (e) collecting the separated charred combustibles in a char tank and thereafter using the same as fuel for the high temperature kiln,
    (f) passing flue gases from the high temperature kiln through the char kiln for incinerating material in the latter,
    (g) also passing the flue gases through the drying kiln for indirectly heating the same,
    (h) also passing the flue gases through the furnace of a water boiler and utilizing steam from the boiler to power an electric generator, and
    (i) ultimately treating the flue gases to remove sulphur, fly ash and other atmospheric pollutants therefrom.

2. The method as defined in claim 1 wherein the treating of flue gases in step (i) includes the steps of oxidizing sulphur dioxide in the flue gases to sulphur trioxide in the presence of localized heat produced by an electric arc, and thereafter passing the flue gases through a bubble tower containing water to convert the sulphur trioxide to sulphuric acid.

3. In an apparatus for disposal of solid waste material such as trash, garbage and solid sewage constituents, the combination of means for comminuting the solid material into fragments, a drying kiln receiving the fragmented material from said comminuting means, at least one char kiln and a high temperature kiln arranged in series with said drying kiln for burning combustible components of the dried material and leaving incombustible components as inert residue for discharge from the high temperature kiln, means for separating and collecting a portion of charred combustibles from material in said char kiln for use thereof as fuel for said high temperature kiln, means for passing flue gases from the high temperature kiln through the char kiln to incinerate material in the latter, means for also passing the flue gases through the drying kiln for indirectly heating the same, a water boiler having a furnace through which the flue gases are also passed, an electric generator powered by steam from said boiler, and means for ultimately treating the flue gases to remove sulphur, fly ash and other atmospheric pollutants therefrom, said means for treating the flue gases including means for oxidizing sulphur dioxide content of the gases to sulphur trioxide, and a bubble tower through which the flue gases are passed, said tower containing water to convert the sulphur trioxide to sulphuric acid.

References Cited

UNITED STATES PATENTS

| | | | |
|---|---|---|---|
| 3,491,708 | 1/1970 | Burden et al. | 110—15 X |
| 2,391,566 | 12/1945 | Goodell | 201—21 X |
| 3,172,725 | 3/1965 | Rugh | 55—73 X |
| 3,505,008 | 4/1970 | Frevel et al. | 55—73 X |
| 3,434,932 | 3/1969 | Mansfield | 201—44 X |
| 2,955,077 | 10/1960 | Welinsky | 201—44 X |
| 3,574,065 | 4/1971 | Eddinger et al. | 201—44 X |

MICHAEL ROGERS, Primary Examiner

U.S. Cl. X.R.

55—73; 110—8, 15; 201—21, 44; 210—152; 423—528